US012671450B2

(12) United States Patent
Lu et al.

(10) Patent No.: US 12,671,450 B2
(45) Date of Patent: Jun. 30, 2026

(54) AUTOMATIC-TUNING METHOD AND AUTOMATIC-TUNING SYSTEM

(71) Applicant: Wistron NeWeb Corporation, Hsinchu (TW)

(72) Inventors: Chien-Jung Lu, Hsinchu (TW);
Bo-Rong Ye, Hsinchu (TW);
Ling-Hung Hsieh, Hsinchu (TW);
Chih-Hung Yang, Hsinchu (TW)

(73) Assignee: WISTRON NEWEB CORPORATION, Hsinchu (TW)

( * ) Notice: Subject to any disclaimer, the term of this patent is extended or adjusted under 35 U.S.C. 154(b) by 339 days.

(21) Appl. No.: 18/616,388

(22) Filed: Mar. 26, 2024

(65) Prior Publication Data

US 2024/0333328 A1      Oct. 3, 2024

(30) Foreign Application Priority Data

Mar. 28, 2023    (TW) .................................. 112111838

(51) Int. Cl.
*H04B 17/309* (2015.01)
*H04B 1/14* (2006.01)
*H04B 17/373* (2015.01)

(52) U.S. Cl.
CPC ............. *H04B 1/14* (2013.01); *H04B 17/347* (2023.05); *H04B 17/373* (2015.01)

(58) Field of Classification Search
CPC ...... H04B 1/14; H04B 17/309; H04B 17/347; H04B 17/373
See application file for complete search history.

(56) References Cited

FOREIGN PATENT DOCUMENTS

CN        107957518 A      4/2018
CN        108776258 A      11/2018

*Primary Examiner* — Tuan H Nguyen
(74) *Attorney, Agent, or Firm* — McClure, Qualey & Rodack, LLP

(57)                ABSTRACT

An automatic-tuning method and an automatic-tuning system are provided. The automatic-tuning method includes: obtaining a first data rate and a first signal quality index of an object located at a coordinate point; controlling an attenuator to change a total path loss according to the first data rate and the first signal quality index to obtain a second signal quality index and a second data rate; determining whether to update a signal quality reference value and a coordinate reference value according to the second signal quality index and the second data rate, if so, the signal quality reference value and the coordinate reference value are updated with the second signal quality index and the coordinate point; and confirming whether the signal quality reference value is less than or equal to a preset signal quality threshold to determine whether to output the signal quality reference value and the coordinate reference value.

20 Claims, 4 Drawing Sheets

S0

AUTOMATIC-TUNING METHOD AND AUTOMATIC-TUNING SYSTEM

RELATED APPLICATIONS

This application claims priority to Taiwan Application Serial Number No. 112111838, filed Mar. 28, 2023, which is herein incorporated by reference.

BACKGROUND

Technical Field

The present disclosure relates to an automatic-tuning method and an automatic-tuning system, and more particularly, to an automatic-tuning method and an automatic-tuning system for testing.

Description of Related Art

The general WiFi coverage (Rate vs. Range, RvR) test uses an attenuator to attenuate the signal strength of a device under test (DUT) to simulate the different distances between the DUT and the instrument, and to detect the performance of WiFi transmission at different distances. However, the conventional WiFi RvR requires a lot of time to manually perform the tuning work before testing, so it is not possible to use the instrument fulltime. In addition, the DUT must be tested sequentially at each coordinate point, so the tuning work takes a long time.

In view of this, an automatic-tuning method and an automatic-tuning system that can perform fully-automated tuning, improve the tuning speed and shorten the overall tuning time are indeed highly anticipated by the public and become the goal and the direction of relevant industry efforts.

SUMMARY

According to one aspect of the present disclosure, an automatic-tuning method for testing an object located at at least one coordinate point includes performing a parameter obtaining step including configuring a processor to obtain a first data rate and a first signal quality index of the object located at the at least one coordinate point; performing an inflection point finding step configuring the processor to control an attenuator to change a total path loss of the object according to the first data rate and the first signal quality index so as to obtain at least one second signal quality index and at least one second data rate, determine whether to update a signal quality reference value and a coordinate reference value according to the at least one second signal quality index and the at least one second data rate, and if so, update the signal quality reference value with one of the at least one second signal quality index and the coordinate reference value with the one of the at least one coordinate point; and performing a signal quality confirmation step configuring the processor to confirm whether the signal quality reference value is less than or equal to a preset signal quality threshold to generate a signal quality confirmation result and determine whether to output the signal quality reference value and the coordinate reference value according to the signal quality confirmation result.

According to another aspect of the present disclosure, an automatic-tuning system for testing an object located at at least one coordinate point includes an attenuator and a processing device. The attenuator is used to change a total path loss of the object. The processing device includes a memory and a processor. The memory stores a preset signal quality threshold. The processor is signally connected to the attenuator and the memory, and obtains a first data rate and a first signal quality index of the object located at one of the at least one coordinate point, controls the attenuator to change the total path loss of the object according to the first data rate and the first signal quality index so as to obtain at least one second signal quality index and at least one second data rate, determines whether to update a signal quality reference value and a coordinate reference value according to the at least one second signal quality index and the at least one second data rate, updates the signal quality reference value with one of the at least one second signal quality index and the coordinate reference value with the one of the at least one coordinate point if so, confirms whether the signal quality reference value is less than or equal to the preset signal quality threshold to generate a signal quality confirmation result, and determines whether to output the signal quality reference value and the coordinate reference value according to the signal quality confirmation result.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected to" another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
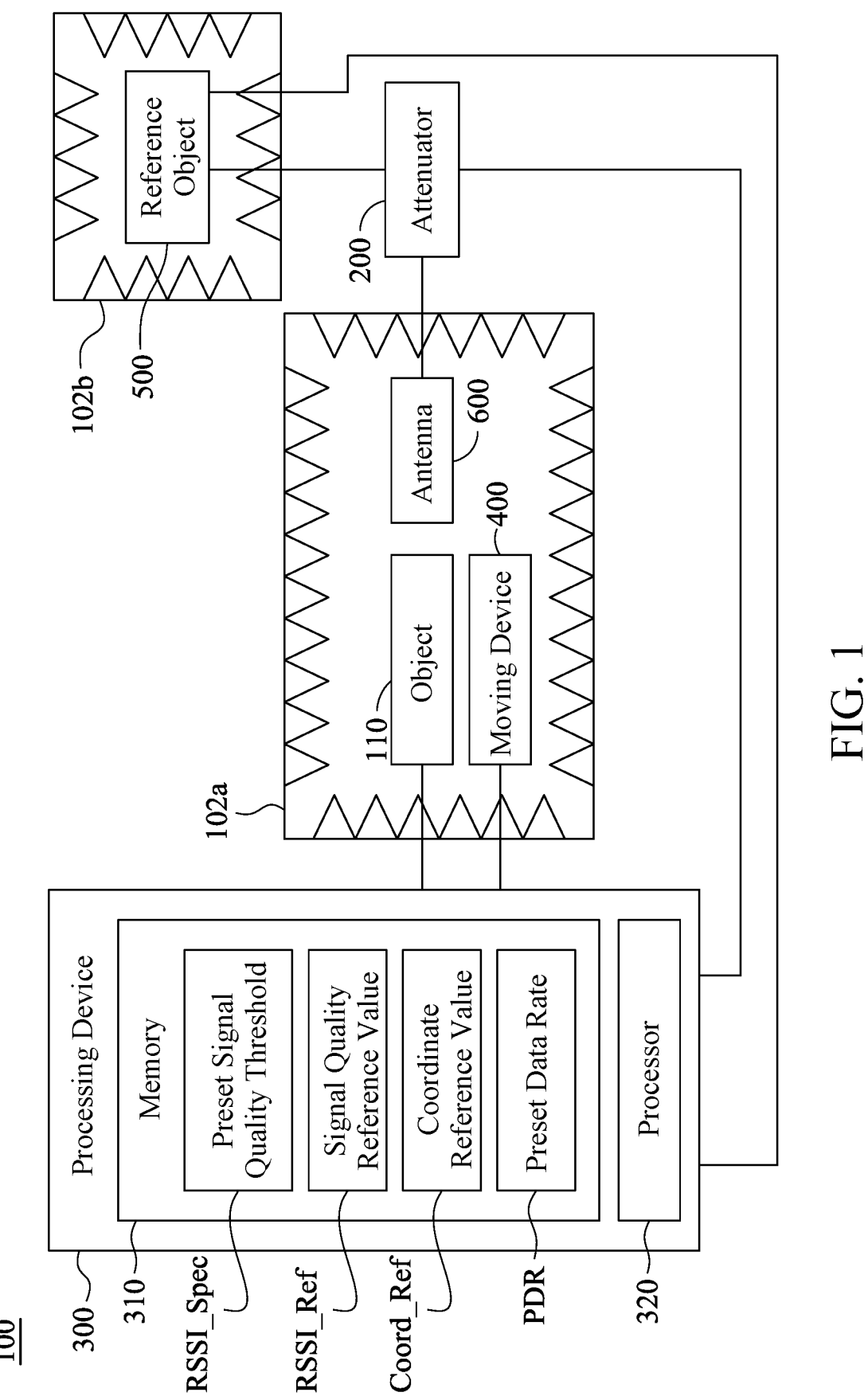
FIG. 1 is a schematic block diagram of an automatic-tuning system according to a first embodiment of the present disclosure.

Referring to FIG. 1. FIG. 1 is a schematic block diagram of an automatic-tuning system 100 according to the first embodiment of the present disclosure. The automatic-tuning system 100 is used to test an object 110 such as a device under test (DUT) located at at least one coordinate point, in other words, this system is the automatic-tuning system 100 for testing. The automatic-tuning system 100 includes an attenuator 200, a processing device 300, a moving device 400, a reference object 500 and an antenna 600.

The attenuator 200 is used to change a total path loss of the object 110, and the total path loss represents the total path loss between the object 110 and the reference object 500. The processing device 300 includes a memory 310 and a processor 320. The memory 310 can store a preset signal quality threshold RSSI_Spec, a signal quality reference value RSSI_Ref, a coordinate reference value Coord_Ref and a preset data rate PDR. The processor 320 is signally connected to the attenuator 200 and the memory 310, and the processor 320 obtains a first data rate and a first signal quality index of the object 110 located at one of the at least one coordinate point. The processor 320 controls the attenuator 200 according to the first data rate and the first signal quality index to change the total path loss of the object 110, so as to obtain at least one second signal quality index and at least one second data rate, and determines whether to update the signal quality reference value RSSI_Ref and the coordinate reference value Coord_Ref according to the at least one second signal quality index and the at least one second data rate. If so or affirmative, the signal quality reference value RSSI_Ref is updated with one of the at least one second signal quality index, and the coordinate reference value Coord_Ref is updated with the one of the at least one coordinate point. Next, the processor 320 confirms whether the signal quality reference value RSSI_Ref is less than or equal to the preset signal quality threshold RSSI_Spec to generate a signal quality confirmation result, and determines whether to output the signal quality reference value RSSI_Ref and the coordinate reference value Coord_Ref according to the signal quality confirmation result.

The moving device 400 is signally connected to and controlled by the processor 320. The number of the at least one coordinate point is plural, and the moving device 400 is used to move the object 110 from one of these coordinate points to another one. The reference object 500 is signally connected to the processor 320 and the attenuator 200. The antenna 600 is signally connected to the attenuator 200 and is disposed corresponding to the object 110 setting. The object 110, the moving device 400 and the antenna 600 are all placed in an isolation box 102a, and the reference object 500 is placed in another isolation box 102b to prevent external interference.

In one embodiment, the isolation boxes 102a and 102b may be isolation rooms for over the air (OTA) testing. The object 110 may be a wireless access point (AP) or a router. Either one of the first signal quality index and the second signal quality index may be a received signal strength indicator (RSSI). Furthermore, the memory 310 can be any data storage element, such as a read-only memory (ROM), a random-access memory (RAM), or a CD read-only memory (CD-ROM), a magnetic tape, a floppy disk or an optical data storage device. The processor 320 can be a digital signal processor (DSP), a micro processing unit (MPU), a central processing unit (CPU), or other electronic processors. In addition, the moving device 400 may be a robot arm or a rotary table, which is used to change the coordinate point of the object 110. The reference object 500 may be a mobile device, a wireless access point or a router, but the present disclosure is not limited thereto.

Figure 2:
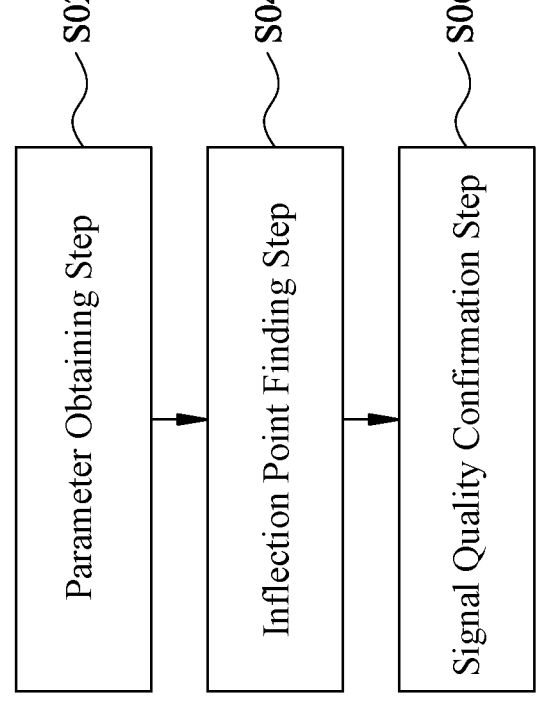
FIG. 2 is a flowchart of an automatic-tuning method according to a second embodiment of the present disclosure.

Referring to FIG. 1 and FIG. 2. FIG. 2 is a flowchart of an automatic-tuning method S0 according to the second embodiment of the present disclosure. The automatic-tuning method S0 is used to test the object 110 located at at least one coordinate point, in other words, this method is the automatic-tuning method S0 for testing. The automatic-tuning method S0 includes a parameter obtaining step S02, an inflection point finding step S04, and a signal quality confirmation step S06.

The parameter obtaining step S02 includes configuring the processor 320 to obtain a first data rate and a first signal quality index of the object 110 located at one of the at least one coordinate point.

The inflection point finding step S04 includes configuring the processor to control the attenuator 200 according to the first data rate and the first signal quality index to change the total path loss of the object 110, so as to obtain at least one second signal quality index and at least one second data rate, and determine whether to update the signal quality reference value RSSI_Ref and the coordinate reference value Coord_Ref according to the at least one second signal quality index and the at least one second data rate. If so, the signal quality reference value RSSI_Ref is updated with one of the at least one second signal quality index, and the coordinate reference value Coord_Ref is updated with the one of the at least one coordinate point. The above-mentioned inflection point (also known as knee point) represents a turning point caused by the change in the theoretical transmission rates of the object 110 and the reference object 500 as the total path loss increases.

The signal quality confirmation step S06 includes configuring the processor 320 to confirm whether the signal quality reference value RSSI_Ref is less than or equal to the preset signal quality threshold RSSI_Spec, generate a signal quality confirmation result, and determine whether to output the signal quality reference value RSSI_Ref and the coordinate reference value Coord_Ref according to the signal quality confirmation result.

As such, the automatic-tuning system 100 and the automatic-tuning method S0 of the present disclosure are used to find the ideal test configuration before the actual test, and it can complete the tuning work, which required manpower to complete in the past, by a fully automatic mode. Furthermore, the present disclosure can effectively automatically find out the best test configuration or the standard-conforming test configuration in all coordinate positions, and improve the issue that the test configuration must be found manually and the equipment cannot be used fulltime in the past, so the utilization rate of the test equipment can be greatly improved, and the overall testing time period can be shortened.

Figure 3:
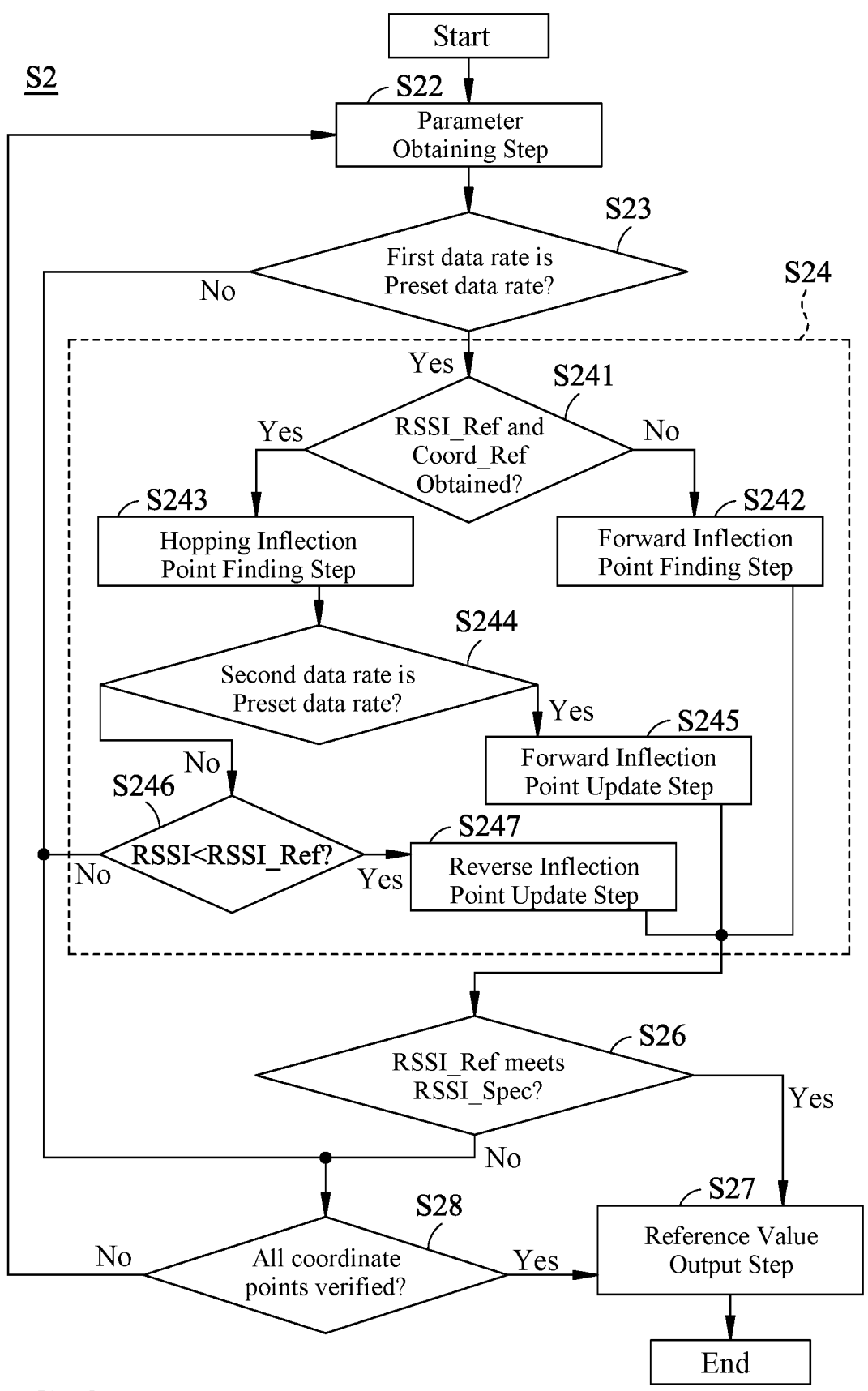
FIG. 3 is a flowchart of an automatic-tuning method according to a third embodiment of the present disclosure.

Referring to FIG. 1 to FIG. 3. FIG. 3 is a flowchart of an automatic-tuning method S2 according to a third embodiment of the present disclosure. The automatic-tuning method S2 includes a parameter obtaining step S22, a data rate confirmation step S23, an inflection point finding step S24, a signal quality confirmation step S26, a reference value output step S27, and a test-all coordinate points step S28.

The parameter obtaining step S22 includes configuring the processor 320 to obtain the first data rate and the first signal quality index of the object 110 at one of the at least one coordinate point. In detail, the parameter obtaining step S22 includes zeroing the attenuator 200 ("zeroing" means setting the initial value), and checking the object 110 located at the $i^{th}$ coordinate point (the initial value of i is 1) to obtain the first data rate and the first signal quality index of the object 110 at the moment. When the parameter obtaining step S22 is repeatedly executed, the value of i will change (such as incrementing) first; in other words, when the parameter obtaining step S22 is repeatedly executed, the moving device 400 will change the coordinate point of the object 110 first, moving the object 110 to the next coordinate point. Then, the processor 320 zeros the attenuator 200, and the object 110 located at the $i^{th}$ coordinate point (i.e., the next coordinate point) is checked to obtain the first data rate and the first signal quality index corresponding to the $i^{th}$ coordinate point.

The data rate confirmation step S23 is to configure the processor 320 to confirm whether the first data rate is a preset data rate PDR and generate a data rate confirmation result, and according to the data rate confirmation result, determine whether to control the attenuator 200 or the moving device 400. When the data rate confirmation result is affirmative, the inflection point finding step S24 is executed, and conversely, when the data rate confirmation result is negative, the test-all coordinate points step S28 is executed. The preset data rate PDR is stored in the memory 310. In one embodiment, the preset data rate PDR can be the theoretical highest transmission rate, but the present disclosure is not limited thereto.

The inflection point finding step S24 includes a reference value determination step S241, a forward inflection point finding step S242, a hopping inflection point finding step S243, another data rate confirmation step S244, a forward inflection point update step S245, a signal quality comparison step S246 and a reverse inflection point update step S247.

The reference value determination step S241 is to configure the processor 320 to determine whether the signal quality reference value RSSI_Ref and the coordinate reference value Coord_Ref are obtained to generate a reference value determination result. When the reference value determination result is negative, the forward inflection point finding step S242 is executed, and conversely, when the reference value determination result is affirmative, the hopping inflection point finding step S243 and the another data rate confirmation step S244 are executed. In other words, according to the reference value determination result, the processor 320 determines whether to control the attenuator 200 to increase gradually (gradually increase a level of the attenuator 200) or to set the attenuator 200 to an initial value plus the difference between the first signal quality index and the signal quality reference value RSSI_Ref.

The forward inflection point finding step S242 includes configuring the processor 320 to control the attenuator 200 to gradually increase so as to increase the total path loss of the object 110, so as to obtain the at least one second signal quality index and the at least one second data rate. In addition, the forward inflection point finding step S242 also includes configuring the processor 320 to find at least one qualified signal quality index from the at least one second signal quality index, and find a best signal quality index from the at least one qualified signal quality index, so as to update the signal quality reference value RSSI_Ref and the coordinate reference value Coord_Ref. The at least one qualified signal quality index meets or conforms to the preset data rate PDR. The signal quality reference value RSSI_Ref is updated with the best signal quality index, and the coordinate reference value Coord_Ref is updated with the one at least one coordinate point.

The hopping inflection point finding step S243 includes configuring the processor 320 to control and set the attenuator 200 to the initial value plus the difference between the first signal quality index and the signal quality reference value RSSI_Ref, and to re-obtain one of the at least one second signal quality index and one of the at least one second data rate.

The another data rate confirmation step S244 is to configure the processor 320 to confirm whether the at least one second data rate is a preset data rate PDR to generate another data rate confirmation result. When the another data rate confirmation result is affirmative, the forward inflection point update step S245 is executed, and conversely, when the another data rate confirmation result is negative, the signal quality comparison step S246 is executed. In other words, according to the another date rate confirmation result, the processor 320 determines whether to control the attenuator 200 to gradually increase or to compare whether the at least one second signal quality index is less than the signal quality reference value RSSI_Ref to generate a signal quality comparison result.

The forward inflection point update step S245 includes configuring the processor 320 to control the attenuator 200 to increase gradually so as to increase the total path loss of the object 110, so as to obtain the remainder of the at least one second signal quality index and the remainder of the at least one second data rate. In addition, the forward inflection point update step S245 further includes a comparison update step. The comparison update step is to configure the processor 320 to find at least one qualified signal quality index from the remainder of the at least one second signal quality index, to find a best signal quality index from the at least one qualified signal quality index, to compare whether the best signal quality index is better than the signal quality reference value RSSI_Ref to generate a comparison result. When the comparison result is affirmative, the signal quality reference value RSSI_Ref and the coordinate reference value Coord_Ref are updated. The signal quality reference value RSSI_Ref is updated with the best signal quality index, and the coordinate reference value Coord_Ref is updated with the one of the at least one coordinate point. When the comparison result is negative, the signal quality reference value RSSI_Ref and the coordinate reference value Coord_Ref maintain their original values. The at least one qualified signal quality index meets the preset data rate PDR.

The signal quality comparison step S246 generates a signal quality comparison result by configuring the processor 320 to compare whether the at least one second signal quality index (corresponding to RSSI) is less than the signal quality reference value RSSI_Ref. When the signal quality comparison result is affirmative, the reverse inflection point update step S247 is executed, and conversely, when the signal quality comparison result is negative, the test-all coordinate points step S28 is executed.

The reverse inflection point update step S247 includes configuring the processor 320 to control the attenuator 200 to gradually decrease so as to decrease the total path loss of the object 110, so as to obtain the remainder of the at least one second signal quality index and the remainder of the at least one second data rate. In addition, the reverse inflection point update step S247 further includes the above-mentioned comparison update step, and its details will not be described herein.

The signal quality confirmation step S26 is to configure the processor 320 to confirm whether the signal quality reference value RSSI_Ref is less than or equal to the preset signal quality threshold RSSI_Spec to generate a signal quality confirmation result, and determine whether to output the signal quality reference value RSSI_Ref and the coordinate reference value Coord_Ref according to the signal quality confirmation result. When the signal quality confirmation result is affirmative, the reference value output step S27 is executed, and the process of the automatic-tuning method S2 is completed; conversely, when the signal quality confirmation result is negative, the test-all coordinate points step S28 is executed.

The reference value output step S27 includes configuring the processor 320 to output the signal quality reference value RSSI_Ref and the coordinate reference value Coord_Ref, or to send the signal quality reference value RSSI_Ref and the coordinate reference value Coord_Ref back to the memory 310 for use in subsequent practical testing.

The test-all coordinate points step S28 includes configuring the processor 320 to confirm whether the object 110 has been checked and tested at all coordinate points to generate a test-all coordinate point result, and determine whether to output the signal quality reference value RSSI_Ref and the coordinate reference value Coord_Ref according to the test-all coordinate point result.

When the test-all coordinate point result is negative, the parameter obtaining step S22 is executed again, and conversely, when the test-all coordinate point result is affirmative, the reference value output step S27 is executed, and the process of the automatic-tuning method S2 is concluded. The number of all the coordinate points is equal to N, that is, all the coordinate points are the sum of the $i^{th}$ coordinate point mentioned above, i=1–N, and N is a positive integer.

Hence, the automatic-tuning method S2 of the present disclosure can work with a programmable moving device 400 and an attenuator 200, and the tuning work, which required manpower to complete in the past, can be done in a fully automatic mode, for example: an effective use of time is when the tuning work is automatically performed during the evening time and holiday time. In addition, through the hopping inflection point finding step S243 which can directly jump to the key attenuation point to determine the inflection point quickly, the judgment speed is greatly improved and the overall judgment time is shortened.

Figure 4:
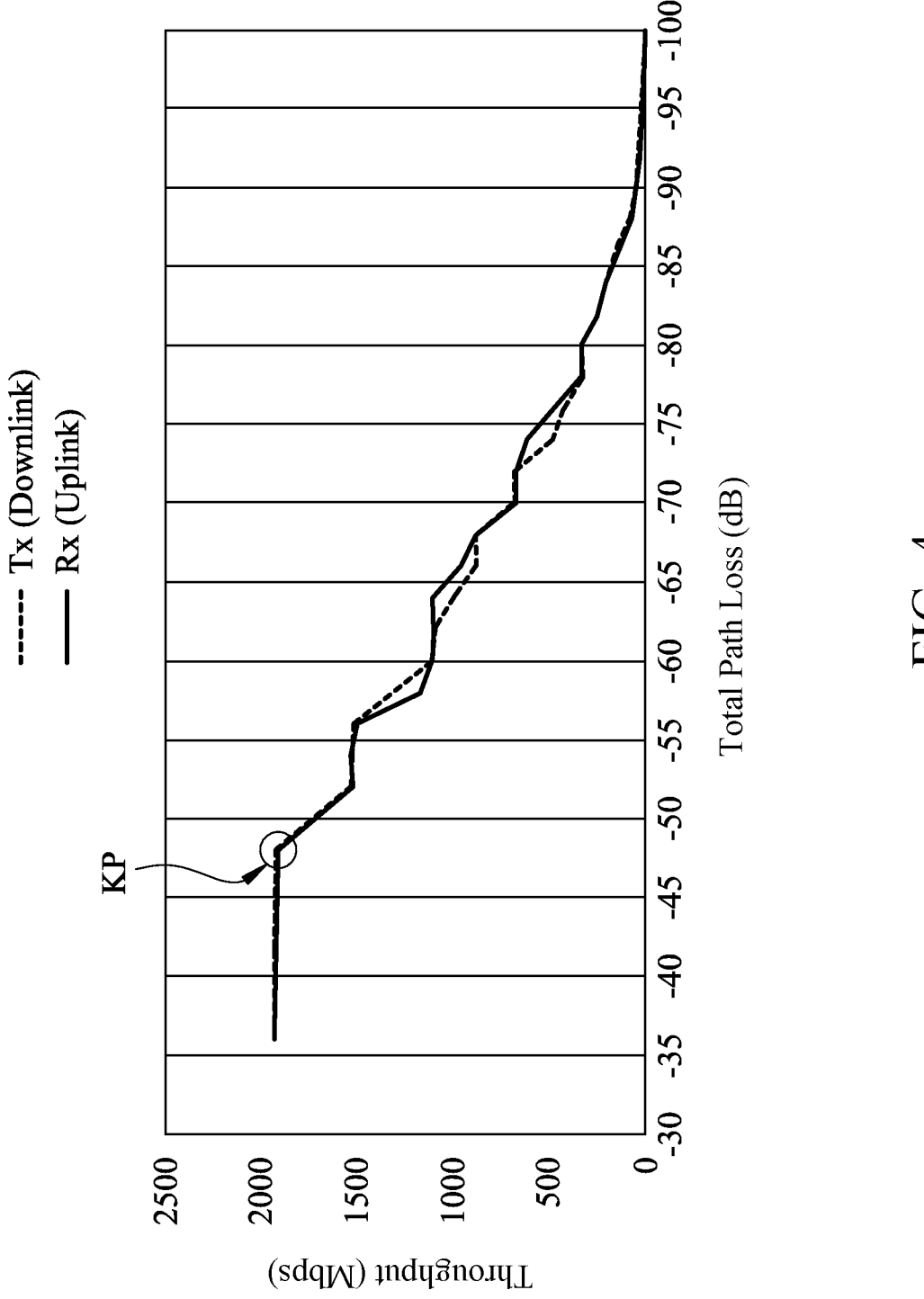
FIG. 4 is a schematic diagram illustrating the relationship between the inflection point, the throughput and the total path loss of the present disclosure in an ideal embodiment.

Referring to FIG. 1, FIG. 3, FIG. 4, and Table 1. FIG. 4 is a schematic diagram illustrating the relationship between the inflection point, the throughput (Mbps) and the total path loss (dB) of the present disclosure in an ideal embodiment, and Table 1 shows relevant parameters of the angle (degree) of the turntable, the preset signal quality threshold RSSI_Spec and the signal quality index of the inflection point KP (inflection point RSSI; unit is dBm) in one embodiment. The inflection point KP in FIG. 4 represents the tipping point at which the total path loss, in other words, the inflection point KP represents the turning point at which the theoretical transmission rate decreases from a highest transmission rate MCS11 to a second highest transmission rate MCS10. "Tx (Downlink)" and "Rx (Uplink)" represent the data sent and received, respectively. In the embodiment in Table 1, the angle of the turntable is shifted from 60 degrees to 75 degrees, each time by an increment of 3 degrees, to change the coordinate point of the object 110, in other words, the number (N) of all coordinate points is greater than or equal to 6. The preset signal quality threshold RSSI_Spec is –48 dBm, and the preset data rate PDR is the highest transmission rate MCS11. In other embodiments, the horizontal axis of FIG. 4 can represent the RSSI (dBm) of the test configuration.

At the outset, the automatic-tuning system 100 performs the first round of process steps of the automatic-tuning method S2 (the angle of the turntable is 60 degrees). The processor 320 obtains the first data rate and the first signal quality index of the object 110 at the first coordinate point (i=1), which are MCS10 and –40 dBm, respectively (step S22). The data rate confirmation result is negative (step S23), and so the test of the object 110 at the first coordinate point is completed. The RSSI of the inflection point in Table 1 is recorded as "Skip", which means that the first coordinate point does not belong to the configuration that conforms to the specification or standard. The test-all coordinate point result in step S28 is negative.

The automatic-tuning system 100 then performs the second round of process steps of the automatic-tuning method S2 (the angle of the turntable is 63 degrees). The first data rate and the first signal quality index obtained in step S22 at the second coordinate point (i=2) are MCS11 and –39 dBm, respectively. The data rate confirmation result in step S23 is affirmative, and the reference value determination result in step S241 is negative (reference value has not yet been obtained).

In step S242, the processor 320 controls the attenuator 200 to increase gradually (from 0 dB to 8 dB) so as to obtain multiple second signal quality indices (–40 dBm, . . . , –45 dBm, –48 dBm) and multiple second data rates (MCS11, . . . , MCS11, MCS10). Then the processor 320 finds the qualified signal quality indices (–40 dBm, . . . , –45 dBm) from the second signal quality indices, and find the best signal quality index (–45 dBm) from the qualified signal quality indices, so that the RSSI_Ref is updated with the best signal quality index and Coord_Ref is updated with the second coordinate point (63 degrees). The signal quality confirmation result in step S26 is negative (RSSI_Ref (–45 dBm) is greater than RSSI_Spec (–48 dBm)), and the test of the object 110 at the second coordinate point is completed. At this time, the RSSI of the inflection point in Table 1 is recorded as "–45", which means that the second coordinate point belongs to the configuration that conforms to the specification or standard but is not the optimal configuration. The test-all coordinate point result in step S28 is negative.

Then, the automatic-tuning system 100 executes the third round of process steps of the automatic-tuning method S2 (the angle of the turntable is 66 degrees). The first data rate and the first signal quality index of the object 110 at the third coordinate point (i=3) are MCS10 and –38 dBm, respectively (step S22). The data rate confirmation result is negative (step S23), and so the test of the object 110 at the third coordinate point is completed. The RSSI of the inflection point in Table 1 is recorded as "Skip" at this time, which means that the third coordinate point does not belong to the configuration that conforms to the specification or standard. The test-all coordinate point result in step S28 is negative.

Then, the automatic-tuning system 100 executes the fourth round of process steps of the automatic-tuning method S2 (the angle of the turntable is 69 degrees). The first data rate and the first signal quality index of the object 110 at the fourth coordinate point (i=4) are MCS11 and –37 dBm, respectively (step S22). The data rate confirmation result is affirmative (step S23), and the reference value determination result is affirmative (step S241). In step S243, the processor 320 controls and sets the attenuator 200 to the initial value (0 dB) plus the difference (8 dB) between the first signal quality index (−37 dBm) and the RSSI_Ref (−45 dBm), and re-obtains the second signal quality index (−45 dBm) and the second data rate (MCS10). The another data rate confirmation result is negative (step S244), the signal quality comparison result is negative (step S246), and so the test of the object 110 at the fourth coordinate point is completed. At this time, the RSSI of the inflection point in Table 1 is recorded as "Worse", which means that the fourth coordinate point does not belong to the configuration that conforms to the specification or standard, and its RSSI of the inflection point is worse than the RSSI_Ref (−45 dBm), so there is no need to update the RSSI_Ref and Coord_Ref. The test-all coordinate point result in step S28 is negative.

Then, the automatic-tuning system 100 performs the fifth round of process steps of the automatic-tuning method S2 (the angle of the turntable is 72 degrees). The first data rate and the first signal quality index of the object 110 at the fifth coordinate point (i=5) are MCS11 and −39 dBm, respectively (step S22). The data rate confirmation result is affirmative (step S23). The reference value determination result is affirmative (step S241), and after step S243 is executed, the another data rate confirmation result is affirmative (step S244).

In step S245, the processor 320 controls the attenuator 200 to increase gradually so as to obtain the remainder of the second signal quality indices (−46 dBm, −47 dBm, −50 dBm) and the remainder of the second data rates (MCS11, MCS11, MCS10). From there the best signal quality index (−47 dBm) is found, and the comparison result between the best signal quality index (−47 dBm) and the RSSI_Ref (−45 dBm) is affirmative (the best signal quality index is smaller than RSSI_Ref, which means it is better). As a result, the RSSI_Ref and the Coord_Ref are updated with the best signal quality index and the fifth coordinate point (72 degrees). The signal quality confirmation result is negative (step S26, RSSI_Ref (−47 dBm) is greater than RSSI_Spec (−48 dBm)), and so the test of the object 110 at the fifth coordinate point is completed. The RSSI of the inflection point record in Table 1 is "−47", which means the fifth coordinate point belong to the configuration that conforms to the specification or standard but is not the optimal configuration. The test-all coordinate point result in step S28 is negative.

Then, the sixth round of process steps of the automatic-tuning method S2 (the angle of the turntable is 75 degrees) is performed by the automatic-tuning system 100. The first data rate and the first signal quality index of the object 110 at the sixth coordinate point (i=6) are MCS11 and −39 dBm, respectively (step S22). The data rate confirmation result is affirmative (step S23), and the reference value determination result is affirmative (step S241). The another data rate confirmation result is affirmative (step S244) after step S243 is executed, and the signal quality confirmation result is affirmative in step S26 (RSSI_Ref (−48 dBm) is equal to RSSI_Spec (−48 dBm)) after step S245 is executed. The processor 320 outputs RSSI_Ref and Coord_Ref (step S27) and ends the process of the automatic-tuning method 82. The above completed the check and test of the object 110 at the sixth coordinate point, at which point the RSSI of the inflection point record in Table 1 is "−48", which indicates that the sixth coordinate point belongs to the configuration that conforms to the specification or standard and is the optimal configuration.

TABLE 1

| Angle | Attenuator (dB) | | | | | | | Inflection Point RSSI |
| (Degree) | 0 | 2 | . . . | 6 | 8 | 10 | 12 | (dBm) |
|---|---|---|---|---|---|---|---|---|
| 60 | MCS10-40 | N/A | N/A | N/A | N/A | N/A | N/A | Skip |
| 63 | MCS11-39 | MCS11-40 | . . . | MCS11-45 | MCS10-48 | N/A | N/A | −45 |
| 66 | MCS10-38 | N/A | N/A | N/A | N/A | N/A | N/A | Skip |
| 69 | MCS11-37 | N/A | N/A | N/A | MCS10-45 | N/A | N/A | Worse |
| 72 | MCS11-39 | N/A | N/A | MCS11-45 | MCS11-46 | MCS11-47 | MCS10-50 | −47 |
| 75 | MCS11-39 | N/A | N/A | N/A | MCS11-47 | MCS11-48 | MCS10-51 | −48 |

11
12

It can be noted that the automatic-tuning methods S0, S2 and the automatic-tuning system 100 of the present disclosure can work with reference data, for example: the antenna configuration and limitation of the object 110 to eliminate or delete the coordinate points that need to be tested and verified, so as to speed up the search. For example, assuming that the moving device 400 is a turntable, the antenna of the object 110 has better signal quality only when the turntable angle is 0 degrees to 180 degrees (corresponding to the front of the antenna), so there is no need to test and verify (corresponding to the back of the antenna) when the turntable angle is 180 degrees to 360 degrees. In this way, the coordinate points that need to be tested and verified can be reduced, so as to shorten the search time.

In summary, the present disclosure has the following advantages. First, with the programmable moving device and the attenuator, the tuning work that required manpower to complete in the past can be completed in fully automatic mode. Second, the hopping inflection point finding step can directly jump to the key attenuation point to quickly judge the inflection point, thereby greatly improving the judgment speed and shortening the overall judgment time. Third, reference data (such as the antenna configuration and limitation of the DUT) can be used to reduce the coordinate points that need to be tested and verified, so as to speed up the search. Fourth, it can effectively automatically find the best or compliant test configuration in all coordinate locations, and improve the conventional problem of manual search and inability to use the equipment at all times, so it can greatly improve the utilization rate of the test equipment and shorten the overall test time.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An automatic-tuning method for testing an object located at at least one coordinate point, the automatic-tuning method comprising:

performing a parameter obtaining step comprising configuring a processor to obtain a first data rate and a first signal quality index of the object located at one of the at least one coordinate point;

performing an inflection point finding step comprising configuring the processor to control an attenuator to change a total path loss of the object according to the first data rate and the first signal quality index so as to obtain at least one second signal quality index and at least one second data rate, determine whether to update a signal quality reference value and a coordinate reference value according to the at least one second signal quality index and the at least one second data rate, and if so, update the signal quality reference value with one of the at least one second signal quality index and the coordinate reference value with the one of the at least one coordinate point; and performing a signal quality confirmation step comprising configuring the processor to confirm whether the signal quality reference value is less than or equal to a preset signal quality threshold to generate a signal quality confirmation result and determine whether to output the signal quality reference value and the coordinate reference value according to the signal quality confirmation result.

2. The automatic-tuning method of claim 1, further comprising:

performing a data rate confirmation step comprising configuring the processor to confirm whether the first data rate is a preset data rate to generate a data rate confirmation result;

wherein, when the data rate confirmation result is affirmative, the inflection point finding step is performed;

wherein, when the data rate confirmation result is negative, a test-all coordinate points step is performed.

3. The automatic-tuning method of claim 1, wherein the inflection point finding step further comprises:

performing a reference value determination step comprising configuring the processor to determine whether the signal quality reference value and the coordinate reference value are obtained to generate a reference value determination result;

wherein, when the reference value determination result is negative, a forward inflection point finding step is performed;

wherein, when the reference value determination is affirmative, a hopping inflection point finding step and another data rate confirmation step are performed.

4. The automatic-tuning method of claim 3, wherein the forward inflection point finding step comprises:

configuring the processor to gradually increase a level of the attenuator to increase the total path loss of the object so as to obtain the at least one second signal quality index and the at least one second data rate; and configuring the processor to find at least one qualified signal quality index that meets a preset data rate from the at least one second signal quality index and find a best signal quality index from the at least one qualified signal quality index to update the signal quality reference value and the coordinate reference value, wherein the signal quality reference value is updated with the best signal quality index, and the coordinate reference value is updated with the one of the at least one coordinate point.

5. The automatic-tuning method of claim 3, wherein the hopping inflection point finding step comprises configuring the processor to set the attenuator with an initial value plus a difference between the first signal quality index and the signal quality reference value and re-obtain one of the at least one second signal quality index and one of the at least one second data rate.

6. The automatic-tuning method of claim 5, wherein the another data rate confirmation step comprises configuring the processor to confirm whether the one of the at least one second data rate is a preset data rate to generate another data rate confirmation result;

wherein, when the another data rate confirmation result is affirmative, a forward inflection point update step is performed;

wherein, when the another data rate confirmation result is negative, a signal quality comparison step is performed.

7. The automatic-tuning method of claim 6, wherein the forward inflection point update step comprises:

configuring the processor to gradually increase a level of the attenuator to increase the total path loss of the object so as to obtain a remainder of the at least one second signal quality index and a remainder of the at least one second data rate; and configuring the processor to find at least one qualified signal quality index that meets the preset data rate from the remainder of the at least one second signal quality index, find a best signal quality index from the at least one qualified signal quality index, and compare whether the best signal quality index is better than the signal quality reference value to generate a comparison result;

wherein, when the comparison result is affirmative, the signal quality reference value and the coordinate reference value are updated, wherein the signal quality reference value is updated with the best signal quality index, and the coordinate reference value is updated with the one of the at least one coordinate point.

8. The automatic-tuning method of claim 6, wherein the signal quality comparison step comprises configuring the processor to compare whether the at least one second signal quality index is less than the signal quality reference value to generate a signal quality comparison result;

wherein, when the signal quality comparison result is affirmative, a reverse inflection point update step is performed;

wherein, when the signal quality comparison result is negative, a test-all coordinate points step is performed.

9. The automatic-tuning method of claim 8, wherein the reverse inflection point update step comprises:

configuring the processor to gradually decrease a level of the attenuator to decrease the total path loss of the object so as to obtain a remainder of the at least one second signal quality index and a remainder of the at least one second data rate; and configuring the processor to find at least one qualified signal quality index that meets the preset data rate from the remainder of the at least one second signal quality index, find a best signal quality index from the at least one qualified signal quality index, and compare whether the best signal quality index is better than the signal quality reference value to generate a comparison result;

wherein, when the comparison result is affirmative, the signal quality reference value and the coordinate reference value are updated, wherein the signal quality reference value is updated with the best signal quality index, and the coordinate reference value is updated with the one of the at least one coordinate point.

10. The automatic-tuning method of claim 1, further comprising:

performing a test-all coordinate points step configuring the processor to confirm whether the object has been tested at all of the at least one coordinate point to generate a test-all coordinate point result, and determine whether to output the signal quality reference value and the coordinate reference value according to the test-all coordinate point result.

11. An automatic-tuning system for testing an object located at at least one coordinate point, the automatic-tuning system comprising:

an attenuator used to change a total path loss of the object; and a processing device comprising:

a memory storing a preset signal quality threshold; and a processor signally connected to the attenuator and the memory, wherein the processor obtains a first data rate and a first signal quality index of the object located at one of the at least one coordinate point, controls the attenuator to change the total path loss of the object according to the first data rate and the first signal quality index so as to obtain at least one second signal quality index and at least one second data rate, determines whether to update a signal quality reference value and a coordinate reference value according to the at least one second signal quality index and the at least one second data rate, updates the signal quality reference value with one of the at least one second signal quality index and the coordinate reference value with the one of the at least one coordinate point if so, confirms whether the signal quality reference value is less than or equal to the preset signal quality threshold to generate a signal quality confirmation result, and determines whether to output the signal quality reference value and the coordinate reference value according to the signal quality confirmation result.

12. The automatic-tuning system of claim 11, wherein any one of the first signal quality index and the at least one second signal quality index is a received signal strength indicator (RSSI).

13. The automatic-tuning system of claim 11, further comprising:

a moving device signally connected to the processor and controlled by the processor, wherein a number of the at least one coordinate point is plural, and the moving device is configured to move the object from one of the plurality of coordinate points to another one.

14. The automatic-tuning system of claim 13, wherein the memory stores a preset data rate, the processor confirms whether the first data rate is the preset data rate to generate a data rate confirmation result, and determines whether to control the attenuator or the moving device according to the data rate confirmation result.

15. The automatic-tuning system of claim 11, wherein the attenuator is set to an initial value, the processor determines whether the signal quality reference value and the coordinate reference value are obtained to generate a reference value determination result, and determines to gradually increase a level of the attenuator or to set the attenuator with the initial value plus a difference between the first signal quality index and the signal quality reference value according to the reference value determination result.

16. The automatic-tuning system of claim 15, wherein the memory stores a preset data rate, and when the reference value determination result is negative, the processor gradually increases the level of the attenuator to increase the total path loss of the object so as to obtain the at least one second signal quality index and the at least one second data rate; and the processor finds at least one qualified signal quality index that meets the preset data rate from the at least one second signal quality index, finds a best signal quality index from the at least one qualified signal quality index to update the signal quality reference value and the coordinate reference value, wherein the signal quality reference value is updated with the best signal quality index, and the coordinate reference value is updated with the one of the at least one coordinate point.

17. The automatic-tuning system of claim 15, wherein when the reference value determination result is affirmative, the processor sets the attenuator to the initial value plus the difference between the first signal quality index and the signal quality reference value, and re-obtains one of the at least one second signal quality index and one of the at least one second data rate.

18. The automatic-tuning system of claim 17, wherein the memory stores a preset data rate, the processor confirms whether the one of the at least one second data rate is the preset data rate to generate another data rate confirmation result, and determines to gradually increase the level of the attenuator or to generate a signal quality comparison result by comparing whether the one of the at least one second signal quality index is less than the signal quality reference value according to the another data rate confirmation result.

19. The automatic-tuning system of claim 18, wherein when the another data rate confirmation result is affirmative, the processor gradually increases the level of the attenuator to increase the total path loss of the object so as to obtain a remainder of the at least one second signal quality index and a remainder of the at least one second data rate; and the processor finds at least one qualified signal quality index that meets the preset data rate from the remainder of the at least one second signal quality index, finds a best signal quality index from the at least one qualified signal quality index, and compares whether the best signal quality index is better than the signal quality reference value to generate a comparison result;

wherein, when the comparison result is affirmative, the processor updates the signal quality reference value and the coordinate reference value, wherein the signal quality reference value is updated with the best signal quality index, and the coordinate reference value is updated with the one of the at least one coordinate point.

20. The automatic-tuning system of claim 18, wherein when the another data rate confirmation result is negative, and the signal quality comparison result is affirmative, the processor gradually decreases the level of the attenuator to decrease the total path loss of the object so as to obtain a remainder of the at least one second signal quality index and a remainder of the at least one second data rate; and the processor finds at least one qualified signal quality index that meets the preset data rate from the remainder of the at least one second signal quality index, finds a best signal quality index from the at least one qualified signal quality index, and compares whether the best signal quality index is better than the signal quality reference value to generate a comparison result;

wherein, when the comparison result is affirmative, the processor updates the signal quality reference value and the coordinate reference value, wherein the signal quality reference value is updated with the best signal quality index, and the coordinate reference value is updated with the one of the at least one coordinate point.

* * * * *